(12) United States Patent
Karagitz et al.

(10) Patent No.: US 7,503,610 B2
(45) Date of Patent: Mar. 17, 2009

(54) ADJUSTABLE VEHICLE CARGO LOAD FLOOR

(75) Inventors: William A. Karagitz, Royal Oak, MI (US); D. Scott Bittinger, Fenton, MI (US); Shawn R. Williams, Auburn Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/836,361

(22) Filed: Aug. 9, 2007

(65) Prior Publication Data

US 2009/0039679 A1    Feb. 12, 2009

(51) Int. Cl.
*B60J 7/00* (2006.01)
(52) U.S. Cl. .................................. 296/37.16; 296/37.14
(58) Field of Classification Search ................ 296/37.3, 296/37.14, 37.16
See application file for complete search history.

(56) References Cited

U.S. PATENT DOCUMENTS 5,836,637 A * 11/1998 Laginess et al. ............... 296/75
6,719,348 B1 * 4/2004 Song ........................ 296/39.1

* cited by examiner

*Primary Examiner*—Joseph D Pape
(74) *Attorney, Agent, or Firm*—Ralph E. Smith

(57) ABSTRACT

A reversible lid of a cargo bin also function as a cargo load floor. The cargo load floor is located behind a rear passenger seat and above a spare tire. When the lid is closed, a first flat loading surface is parallel to the ground upon which the vehicle rests while the opposite side of the lid defines the second flat loading surface that is angled with respect to the ground but 180 degrees to the rear surface of a folded forward rear passenger seat to create a smooth continuous loading surface to slide cargo onto the rear surface of the rear seat. A peripheral protruding portion surrounds the first flat loading surface to retain cargo while grooves in the loading surface may accommodate any deposition of water and mud from cargo. The load floor pivots to open while at opposite corners locking tabs secure into holes to lock the load floor closed.

20 Claims, 9 Drawing Sheets

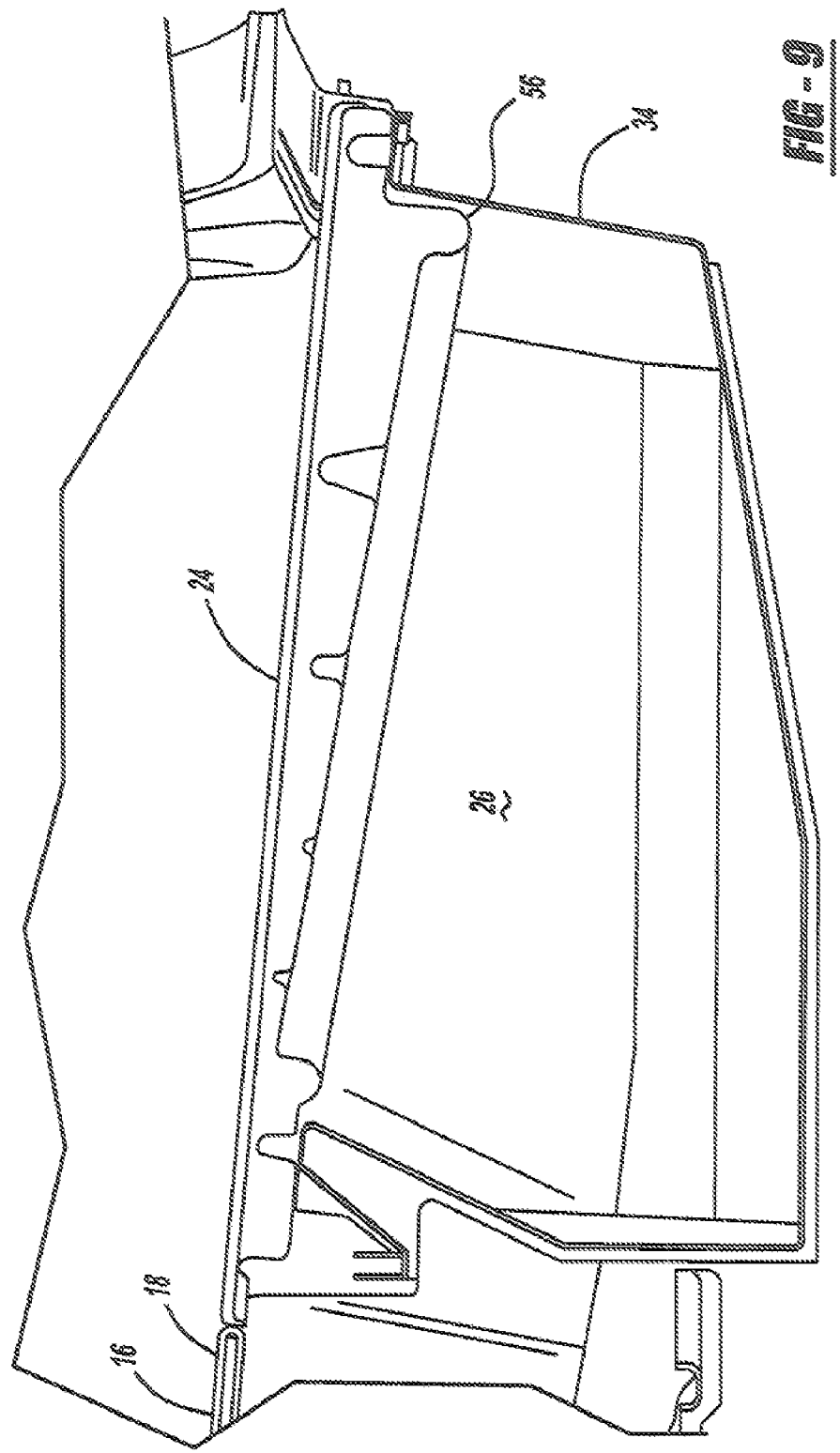

ADJUSTABLE VEHICLE CARGO LOAD FLOOR

FIELD

The present invention relates to an adjustable load floor that serves as a lid for a vehicle cargo container.

BACKGROUND

Motor vehicles may include cargo bins in the floor for stowing various articles. These cargo bins, however, are not without their share of limitations. One limitation of a current cargo bin is that the cargo bin lid may not serve as an actual load-supporting floor of the interior of the vehicle. Another limitation is that such cargo bins are not removable from the vehicle. Another limitation of current cargo bins is that such lids are not level and do not facilitate the retention of water, mud, etc. on a moisture-proof bin surface. Still yet, another limitation is that current cargo lid surfaces may not align with the surface of an adjacent seat back when the seat back is in its folded forward position for cargo stowage. Continuing, another limitation is that current cargo bin lids are not easily reversible, that is, having a level, moisture retaining surface on one side, and a carpeted, inclined surface on the opposite lid surface.

What is needed then is a device that does not suffer from the above limitations. This, in turn, will provide a reversible cargo bin lid that also functions as a vehicle interior cargo load floor having one side that is a level moisture-retaining side and another side that is inclined to match and continue the inclined surface of an adjacent, folded forward, seat back.

SUMMARY

A reversible lid of a cargo bin also functions as a cargo load floor in the rear of a vehicle. The cargo load floor may be located behind a rear passenger seat, such as a second or third row rear passenger seat, and above a spare tire that is mounted under the vehicle, for example. When the load floor or lid is in its closed position, a first flat loading surface is parallel to the ground upon which the vehicle rests. When the load floor is reversed and the opposite side of the lid, or second flat loading surface is ready for use, the second flat loading surface is inclined with respect to the ground upon which the vehicle rests. This angled second surface forms an approximately 180 degree angle with the rear surface of a folded forward rear passenger seat to create a continuous, flat loading surface to slide cargo onto the rear surface of the rear seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a side view of the adjustable cargo load floor according to the present teachings.

DETAILED DESCRIPTION

Figure 1:
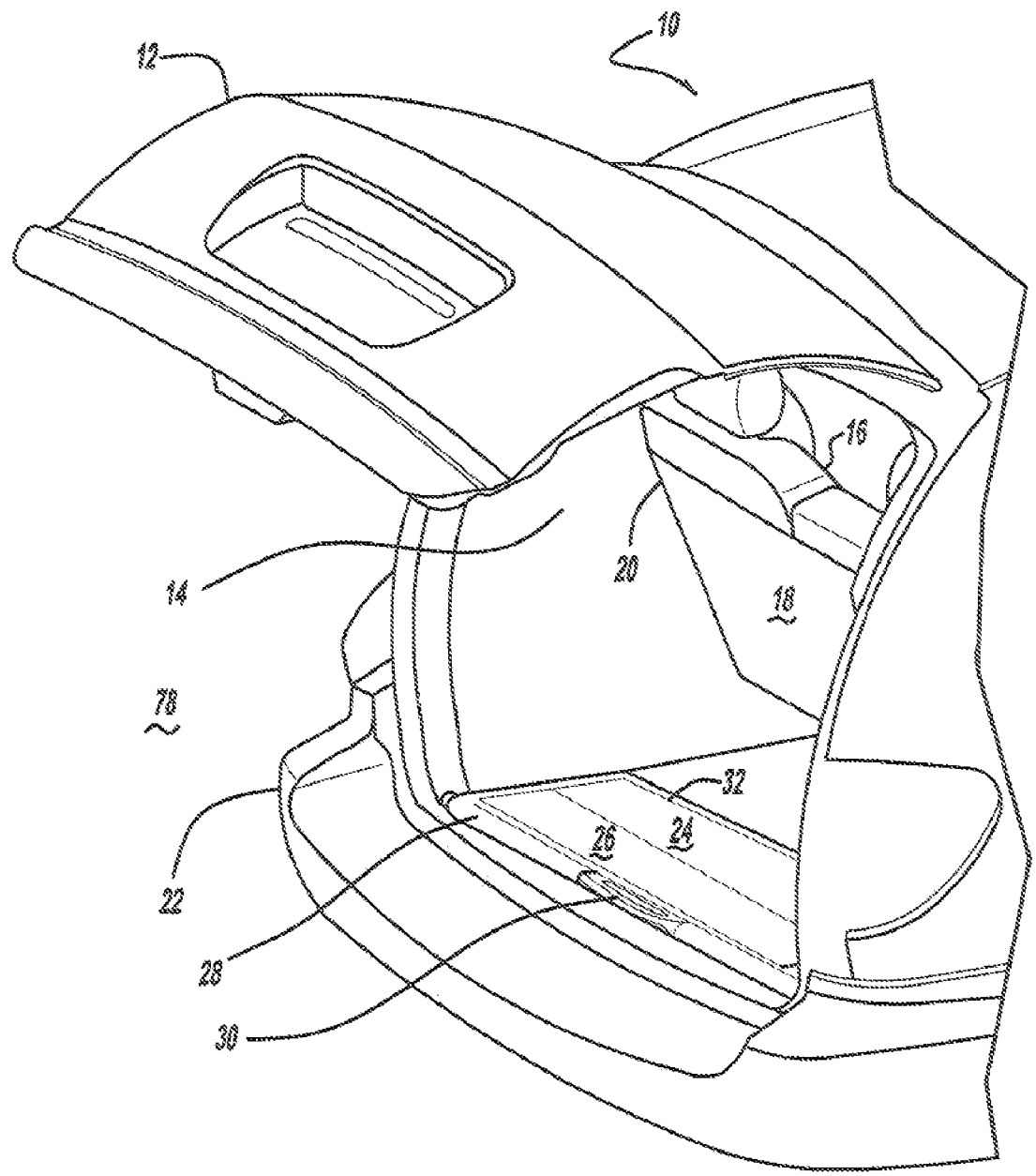
FIG. 1 is a rear perspective view of a vehicle depicting a location of an adjustable cargo load floor according to the present teachings.

The following description of the preferred embodiments is merely exemplary in nature and is in no way intended to limit the invention, its application, or uses. Turning first to FIG. 1, a vehicle 10 with an open tailgate or liftgate 12 reveals a rear cargo area 14 located behind a rear passenger seat 16, which has a rearward facing surface 18 as part of a seat back 20. Between the seat back 20 in its upright position and the rear bumper 22, a cargo load floor 24 resides over and is a covering for an internal cargo volume 26 located under the cargo load floor 24. To reveal and grant access to the internal cargo volume 26, also known as the cargo load area 26, the cargo load floor 24 is lifted along the lifting side 28 using a handle 30 such that it may pivot along a pivoting side 32.

Figure 2:
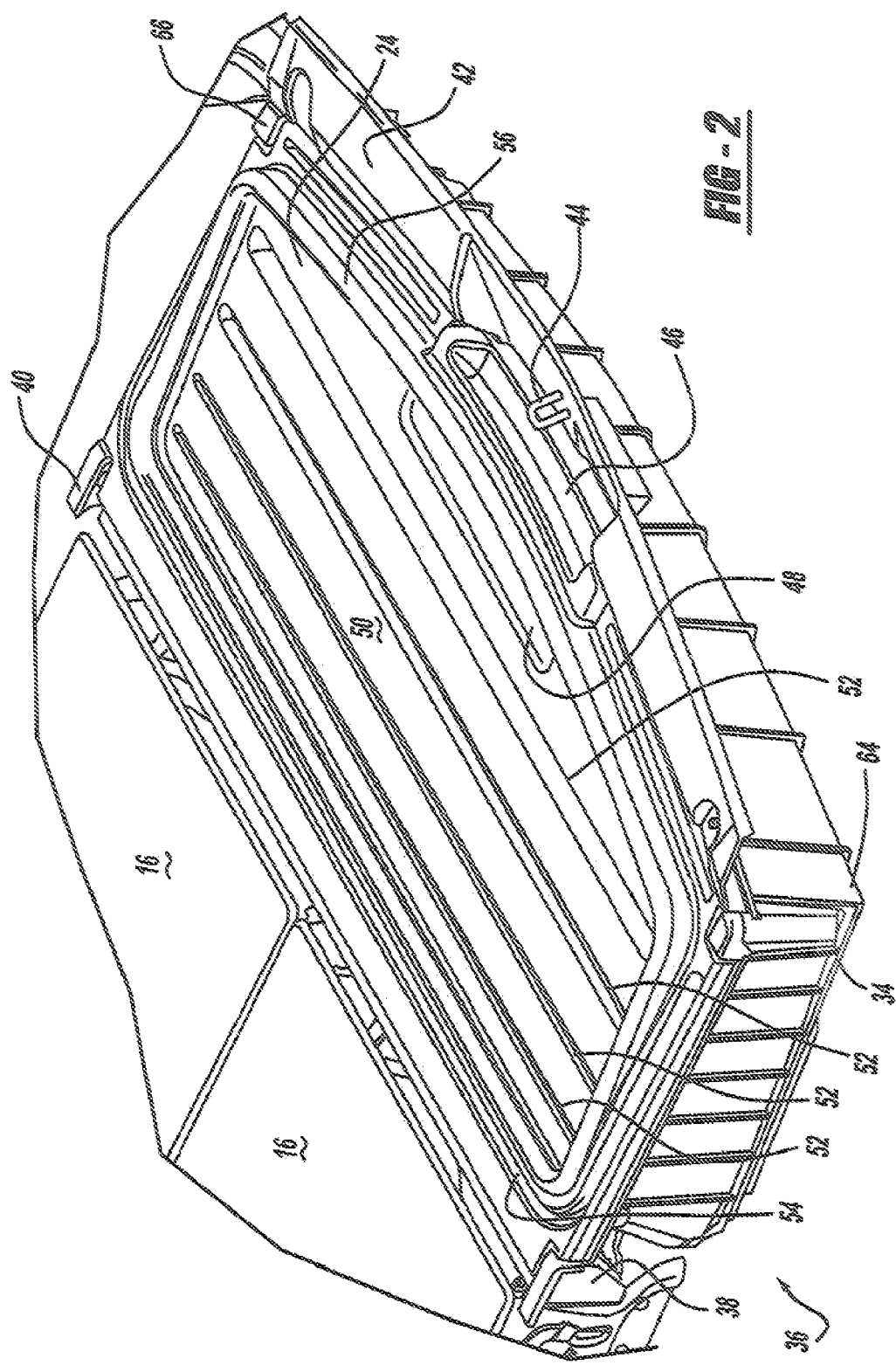
FIG. 2 is a rear perspective view of the adjustable cargo load floor according to the present teachings.

Turning now to FIG. 2, the cargo load floor 24 is depicted over a cargo container 34 and together, the cargo load floor 24 and cargo container 34 forms a cargo bin 36. The cargo load floor 24 may pivot within a left bracket 38 and a right bracket 40 located at the sides of the cargo container 34 such that the cargo load floor 24 can be secured in an open position without a user holding onto the cargo load floor 24. Although throughout the description of the invention, the cargo load floor 24 is referred to as a "floor" because it supports cargo items, it may also be referred to as a "lid" and "covering" because it is a "lid" or "cover" for the cargo container 34. Continuing with FIG. 2, when the cargo load floor 24 is in its down or closed position as depicted in FIG. 2, the cargo load floor 24 lies adjacent to, or contacts, a rear sill 42, which spans the rear interior area of the vehicle 10 and surrounds a rear latch 44 to which a corresponding portion of the liftgate 12 secures. The cargo load floor 24 may have an outer handle 46 molded into its rear edge. The cargo load floor 24 is equipped with an outer handle 46 that functions in two positions of the cargo load floor 24 because the cargo load floor 24 is adjustable, that is, both large flat sides each have a purpose, which will be explained.

Figure 3:
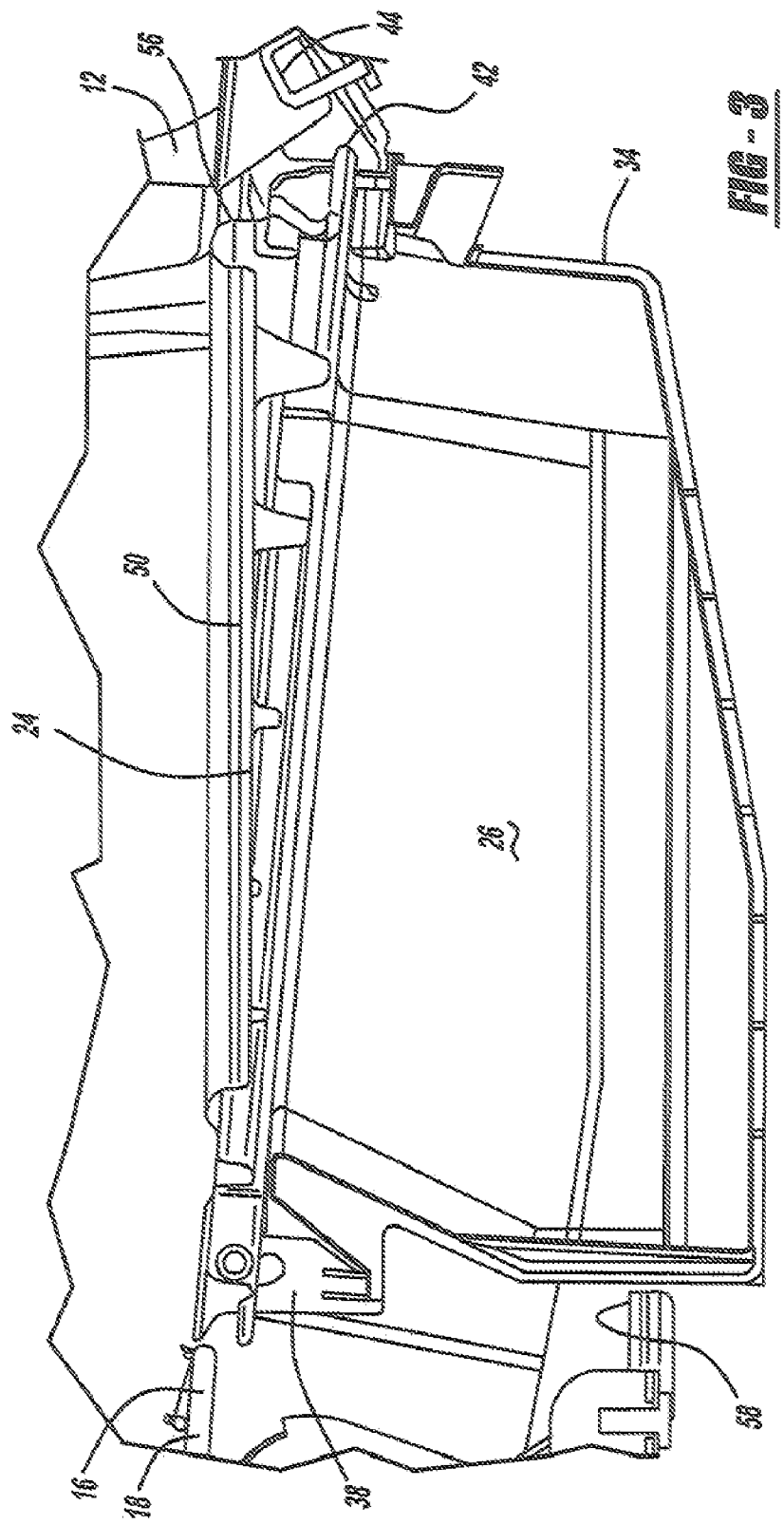
FIG. 3 is a side view of the adjustable cargo load floor according to the present teachings.

The cargo load floor 24 depicted in FIGS. 2 and 3 is a generally flat, large load surface 50, despite and relative to the various grooves and recessions in the surface 50. The surface 50 is not inclined relative to level ground 78 upon which the vehicle 10 may rest, thus cargo, be it cardboard boxes, bags of groceries, sports equipment, suitcases, etc. will not slide or shift in transit, as it otherwise would if such cargo were on an inclined surface. Stated another way, the surface 50 is parallel to the ground 78. Continuing with FIG. 2, the flat load surface 50 has various grooves 52 or recessions to capture any water or other liquids, mud, particles of dirt, dust, etc. that may result from items transported on the cargo load floor 24. Despite the grooves 52, the flat load surface 50 is level and may support various types of cargo. While the grooves 52 may naturally capture liquids and debris as such falls from wet and muddy sporting equipment, for example, such grooves 52 may be utilized deliberately by a person who may push or direct such water or muddy debris directly into the grooves 52 to clear the surface 50. The cargo load floor 24 also has a peripheral groove 54 that may act as another receptacle for liquids and debris that falls from cargo transported on the cargo load floor 24,. Alternatively, the peripheral groove 54 or other grooves 52 may be deliberately used as a receptacle to store small or thin personal cargo items during transport.

Continuing with FIG. 2, the cargo load floor 24 has a peripheral protruding portion 56 or raised boss, also known as a "racetrack." The peripheral protruding portion 56 is a raised structure that acts as an outer securing boundary of the flat load surface 50. The peripheral protruding portion 56 acts as a retainer for items placed on the flat load surface 50. As an example, if a cardboard box were on the flat load surface 50 within the confines of the peripheral protruding portion 56, the box would not slide beyond an inner wall surface of the peripheral protruding portion 56, even if the vehicle 10 were moving up or down an incline.

The cargo load surface 24 employs the grooves 52, peripheral groove 54, the peripheral protruding portion 56, and the outer handle 46 within a single part. That is, the cargo load surface 24 may be manufactured as a single, plastic blow-molded part, such as from polypropylene. By making the cargo load surface 24 from a blow-molding process, the cargo load surface 24 remains lightweight so that it may be lifted with one hand by a user to gain access to the cargo volume 26. Additionally, the cargo load surface 24 may be made quickly and relatively inexpensively, as opposed to a multiple piece cargo floor, which may be heavy or have part interfaces that may permit water or mud to become trapped, possibly causing mold, mildew, etc. and become unsightly. Another advantage of a one piece cargo load surface 24 manufactured as a blow-molded plastic part is that it may be easily removed from the vehicle to wash and clean, such as outside with a garden hose or inside in a large sink.

Figure 4:
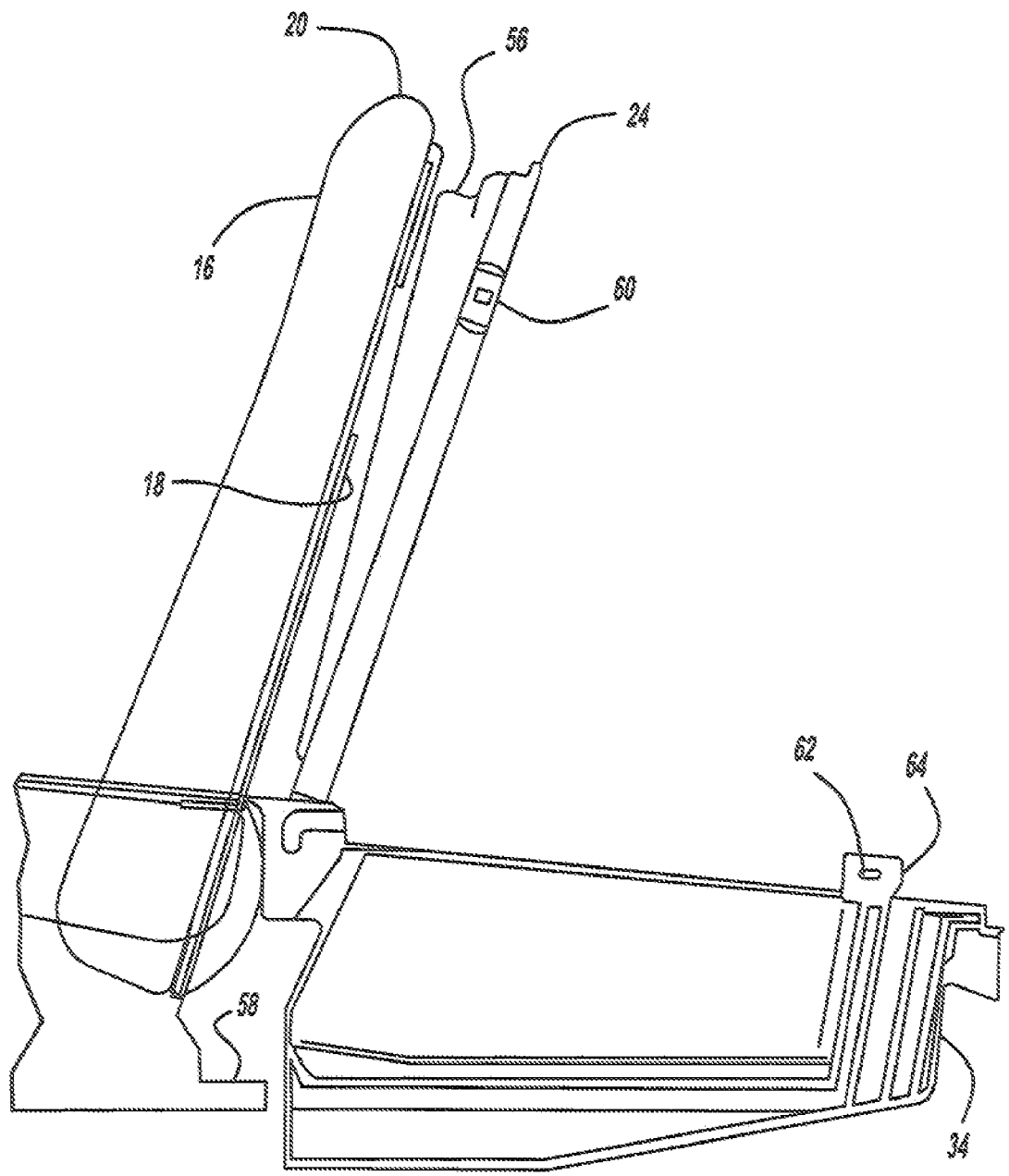
FIG. 4 is a side view of the adjustable cargo load floor according to the present teachings.

Continuing with FIG. 3, the cargo load surface 24 is depicted behind a fold-down rear passenger seat 16. While the rearward facing surface 18 of the rear passenger seat 16 is at an angle to the ground and the cargo load floor 24 when the seat 16 is folded forward, the flat load surface 50 of the cargo load floor 24 is parallel to the ground, or level assuming the vehicle 10 is resting on level ground. FIG. 3 also depicts the cargo container 34 with internal cargo volume 26. More specifically, FIG. 3 generally depicts how the cargo load floor 24 pivots at a rear bracket 38 of the cargo container 34 and how the cargo container 34 is situated relative to the general floor 58 inside the vehicle 10. As depicted in FIGS. 3 and 4, the cargo container 34 is slightly recessed within the rear floor 58 of the vehicle 10.

Figure 5:
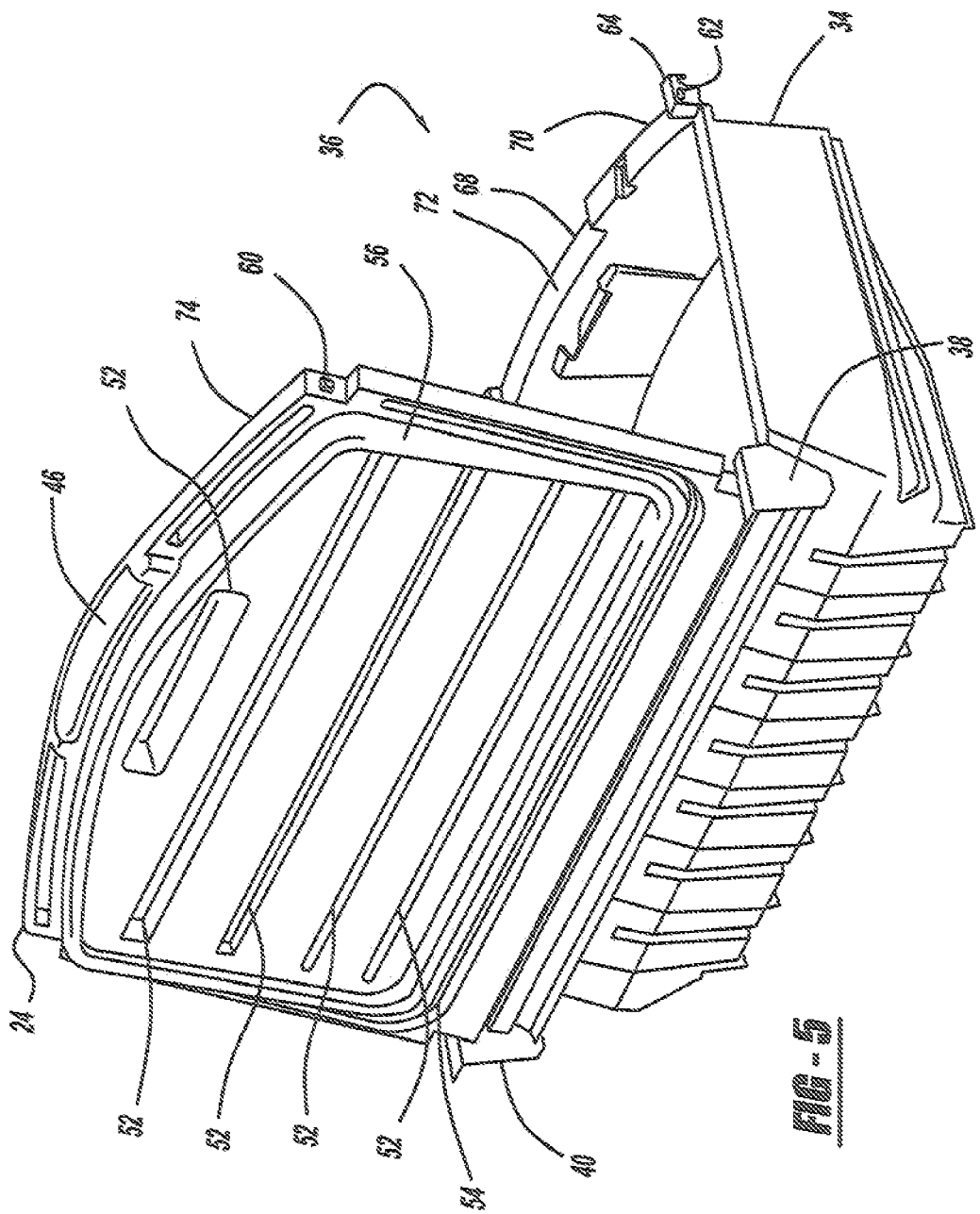
FIG. 5 is a perspective rear view of the adjustable cargo load floor according to the present teachings.

FIG. 4 depicts a position of the cargo load floor 24 relative to the seat back 20 of the rear passenger seat 16, and more specifically, the peripheral protruding portion 56 of the cargo load floor 24 relative to the rearward facing surface 18 of the seat 16. FIG. 5 is a perspective rear view of the adjustable cargo load floor 24 in an upright position. As depicted in FIG. 5, the cargo load floor 24 of the cargo bin 36 exhibits grooves 52, peripheral groove 54, peripheral protruding portion 56, and outer handle 46. Additionally, a locking tab 60 is located at each corner of the cargo load floor 24 opposite to the left bracket 38 and right bracket 40. Such locking tabs 60 lock or secure within a hole 62 in a left front bracket 64 and a right front bracket 66 of the cargo load floor 24. Although the locking tabs 60 lodge within the holes 62 of the brackets 64, 66 to secure the cargo load floor 24 from opening during normal vehicle movement, such as when the vehicle 10 is being driven, the tabs 60 may be easily dislodged by a user who lifts the cargo load floor 24 with one hand in order to secure the cargo load floor 24 in its raised position.

Continuing with FIG. 5, the cargo container 34 of the cargo bin 36 exhibits a front edge 68 that has two levels. The upper edge 70 and lower edge 72 are at such different heights or levels so that a user may place his or her hand within a cavity formed by the lower edge 72 of the cargo container 34 and the front edge 74 of the cargo load floor 24.

Figure 6:
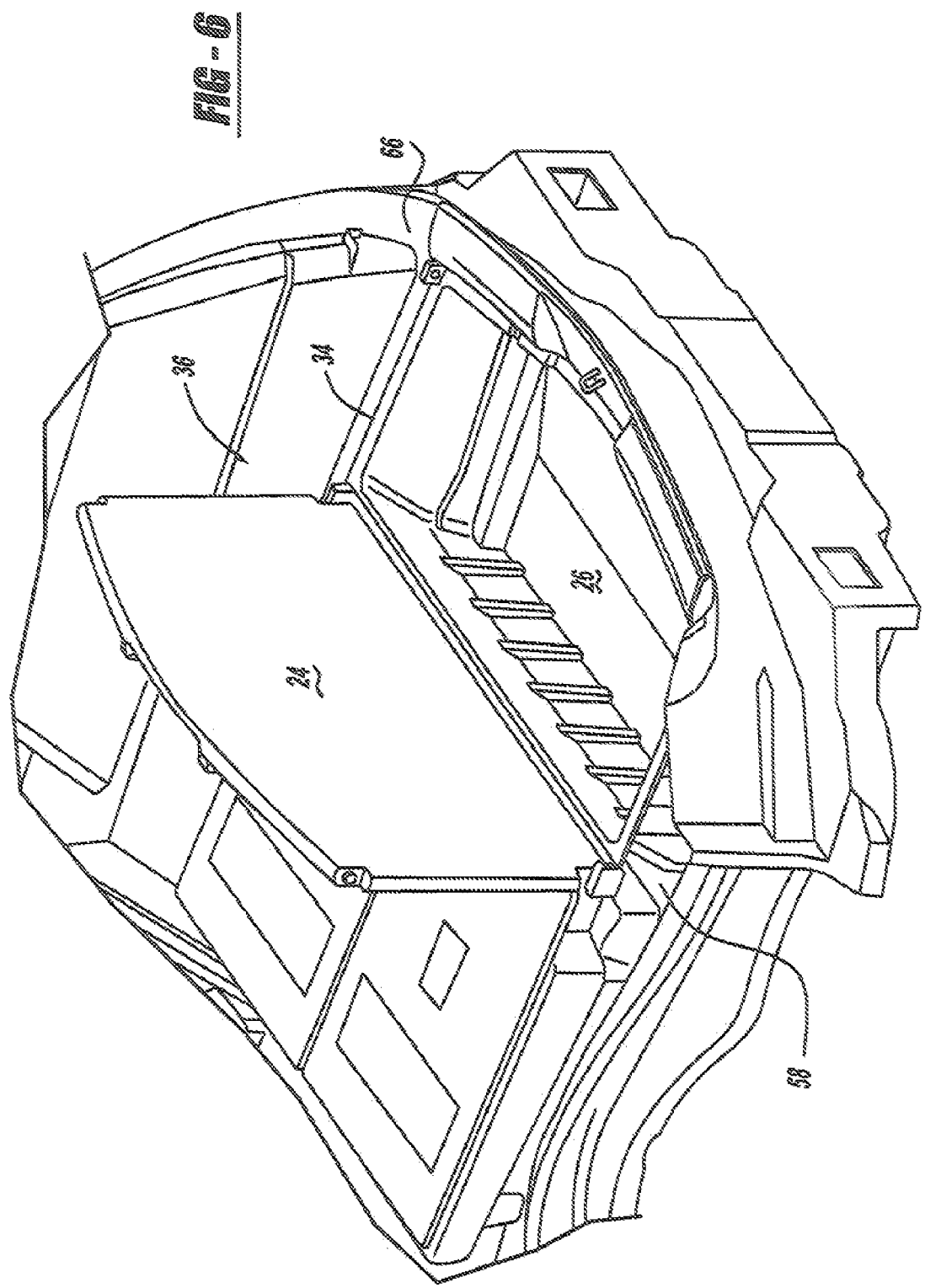
FIG. 6 is a perspective view of the adjustable cargo load floor according to the present teachings.

Continuing with FIG. 6, the cargo bin 36 is depicted in an open configuration to reveal the internal cargo volume 26. The internal cargo volume 26 may be used to store a variety of items wile in transit, such as groceries, sports equipment, tools, safety equipment, etc. Because the cargo container 34 may be manufactured from an injection molded polypropylene, it may also be easily cleaned with water, either while the cargo container 34 is installed within the floor 58 of the rear cargo area 14 or when it is removed from the vehicle 10.

Figure 7:
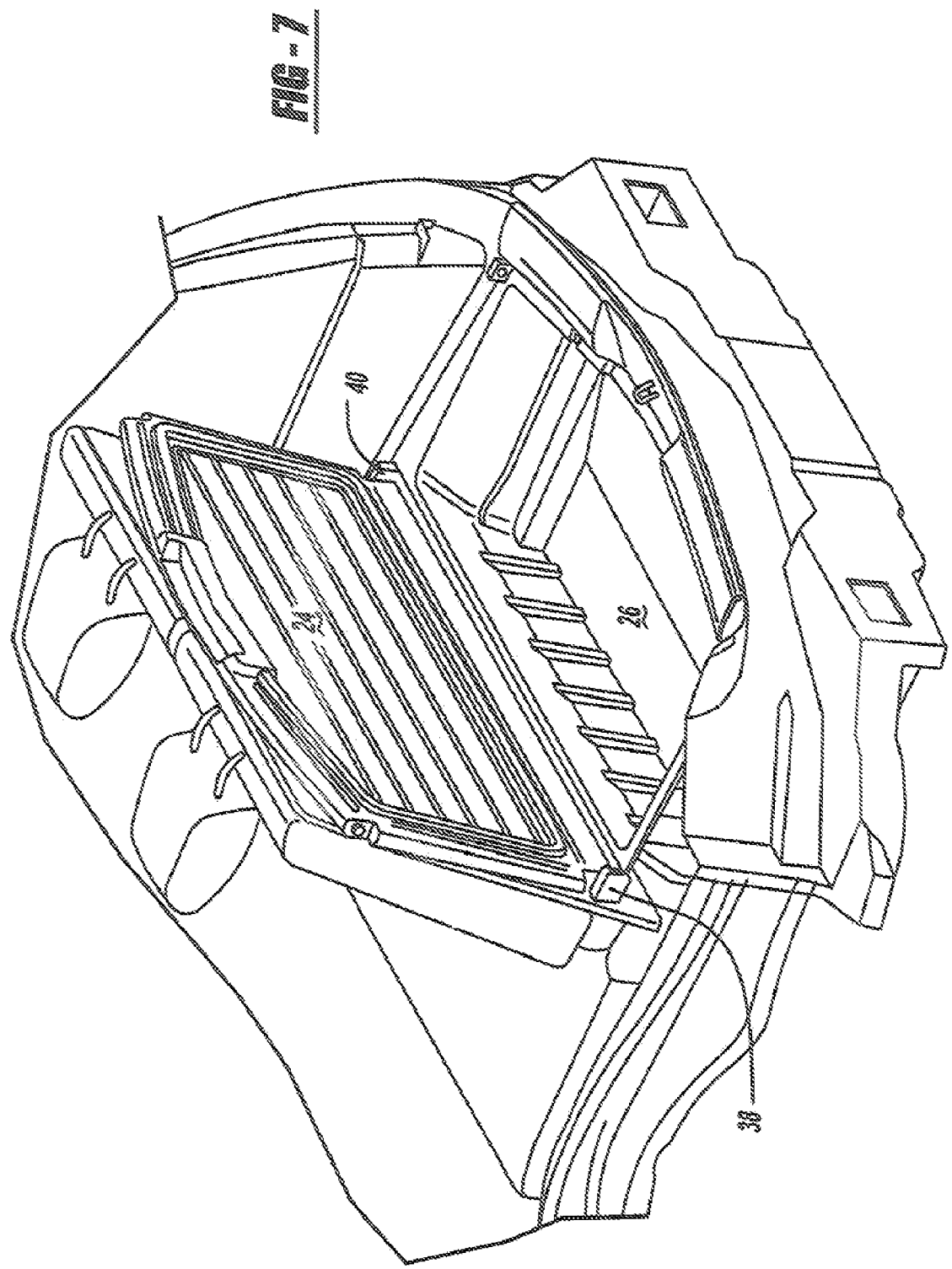
FIG. 7 is a perspective view of the adjustable cargo load floor according to the present teachings.
Figure 8:
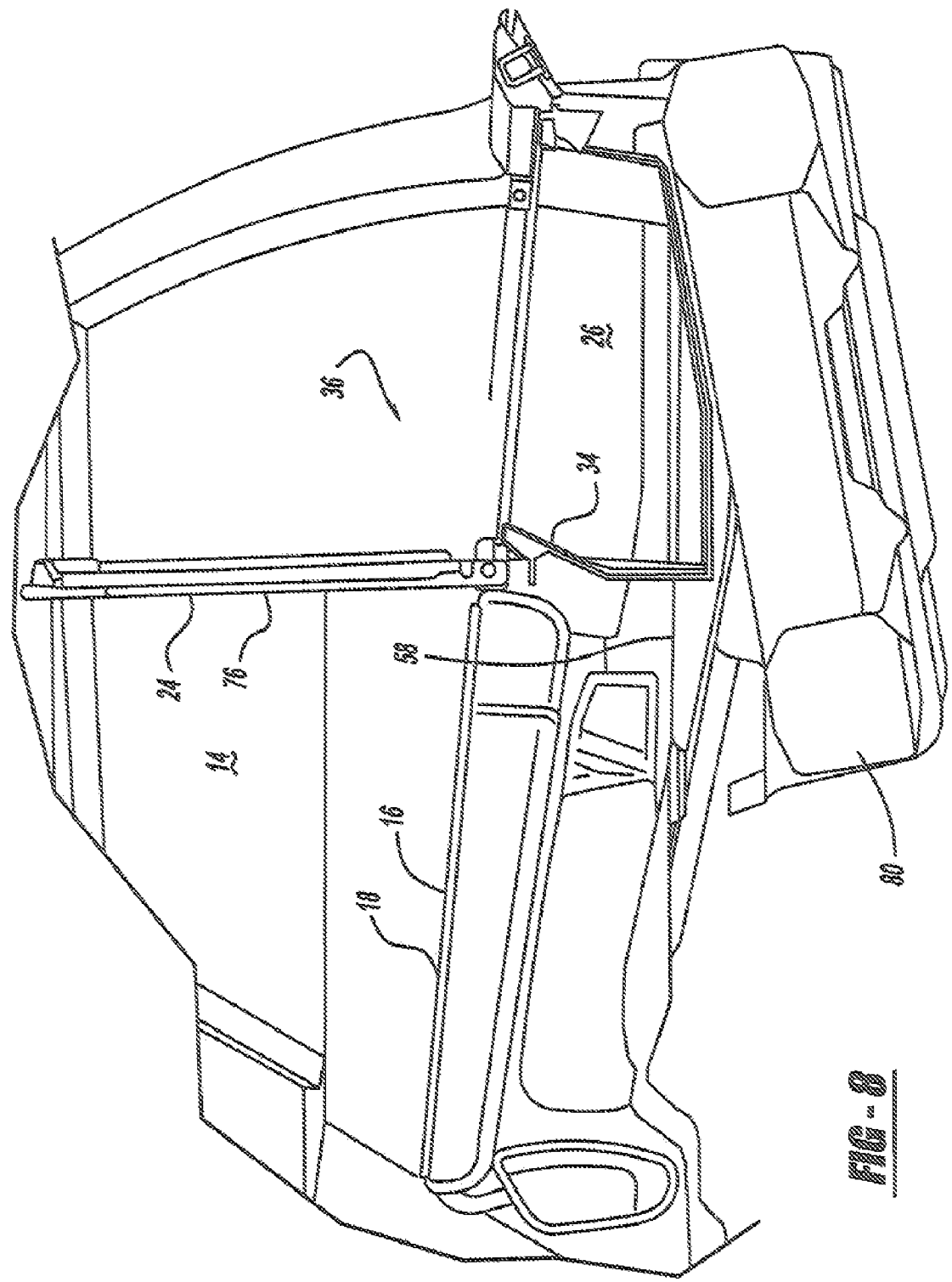
FIG. 8 is a side view of the adjustable cargo load floor and underlying spare tire according to the present teachings.

Turning now to FIGS. 7 and 8, the cargo load floor 24 is depicted in the reverse position from that depicted in FIG. 6. That is, the cargo load floor 24 is affixed to the left bracket 38 and right bracket 40 using the locking tabs 60 such that the cargo load floor 24 is in its reversed or flipped position such that the grooves 52 are facing downward, or into he interior cargo volume 26 and with the flat surface 76 facing the rear cargo volume 14. In FIG. 7, the cargo load floor 24 and the rear passenger seat 16 are depicted in upright positions. When in upright positions, full access is available to the interior cargo volume 26 of the cargo container 34. FIG. 8, being a side view, depicts a spatial relationship between the cargo load floor 24 and rear passenger seat 16; that is, there is minimal space between the left and right brackets 38, 40 and the rear passenger seat 16. The side view of FIG. 8 also depicts a relationship between the cargo bin 36 and a spare tire 80. Of course, the vehicle 10 does not have to be equipped with a spare tire 80 mounted under the rear cargo volume 14, such a spare tire may be stored in other area of the vehicle 10. However, the vehicle 10 may be equipped with the cargo bin 36 as depicted and a spare tire 80 as depicted to fully take advantage of stowage options onboard the vehicle 10.

FIG. 9 is a side view depicting the cargo load floor 24 in its downward position, or that position that covers the cargo volume 26 under the cargo load floor 24 and within the cargo container 34. FIG. 9 also depicts another advantage of the cargo load floor 24. As depicted, the flat surface 76 of the cargo load floor 24 continues the plane or surface from the rearward facing surface 18 of the rear passenger seat 16. Together, the rearward facing surface 18 of the rear passenger seat 16 and the flat surface 76 of the cargo load floor 24 form an angle of 180 degrees, but variations of plus or minus five degrees may be expected. The advantage of such a relationship of surface 18, 76 is that a box or other cargo may be pushed into the rear of the vehicle 10 without being hindered by a load floor that is mismatched in height with an edge of the folded forward sat back surface.

The peripheral protruding portion 56 forms a tight or snug fit with the interior walls of the cargo container 34 when the flat, inclined surface 76 of the cargo container forms an angle that is 180 degrees or approximately 180 degrees with the rear surface of the rear passenger seat. Regardless of which surface of the cargo load floor 24 faces upwardly, or away from the cargo container volume 26, the cargo container 34 resides partially within the interior floor of the vehicle to secure the entire cargo bin 36 during motion of the vehicle 10.

The description of the invention is merely exemplary in nature and, thus, variations that do not depart from the gist of the invention are intended to be within the scope of the inven-

What is claimed is:

1. An adjustable cargo bin for a vehicle comprising:
a rear passenger seat, wherein the rear passenger seat defines a rearward facing surface when the seat is in an upright position;
a cargo container defining a volume; and
a covering for the cargo container, wherein the covering defines a first flat loading surface and a second flat loading surface such that when the first flat loading surface is directed upwardly it is parallel to a ground surface upon which the vehicle is sitting and when the second flat loading surface is directed upwardly it is angled about 180 degrees to the rearward facing surface when the rear passenger seat is folded forward.

2. The adjustable cargo bin of claim 1, further comprising:
a peripheral protruding portion that surrounds the first flat loading surface.

3. The adjustable cargo bin of claim 1, wherein the first flat loading surface defines grooves for the deposition of water and mud.

4. The adjustable cargo bin of claim 1, further comprising:
a peripheral protruding portion that surrounds the first flat loading surface, wherein the first flat loading surface defines grooves for the deposition of water and mud.

5. The adjustable cargo bin of claim 1, wherein the first flat loading surface defines a recession for a handle.

6. The adjustable cargo bin of claim 1, wherein the covering for the cargo container pivots at two corners of the cargo container.

7. The adjustable cargo bin of claim 1, further comprising:
first and second brackets on the cargo container, the brackets each defining a hole; and
first and second locking tabs protruding from corners of the covering, the tabs locking the cover into a closed position.

8. The adjustable cargo bin of claim 1, wherein the covering for the cargo container is blow-molded.

9. The adjustable cargo bin of claim 1, wherein the covering for the cargo container is hollow.

10. The adjustable cargo bin of claim 1, further comprising:
a peripheral protruding portion that surrounds the first flat loading surface, and wherein, when the second flat loading surface is directed upwardly the peripheral protruding portion secures within the cargo container.

11. An adjustable cargo bin for a vehicle comprising:
a rear passenger seat situated above a floor of the vehicle, wherein in an upright position, the rear passenger seat defines a rearward facing surface;
a cargo container that resides partially within the floor of the vehicle; and
a reversible cover on the cargo container, wherein the cover defines a first flat loading surface and a second flat loading surface on opposite sides of the cover such that when the first flat loading surface is directed upwardly it is parallel to a ground surface upon which the vehicle is sitting and when the second flat loading surface is directed upwardly it is angled about 180 degrees to the rearward facing surface of the rear passenger seat when the rear passenger seat is folded forward.

12. The adjustable cargo bin of claim 1, further comprising:
a peripheral protruding portion that surrounds the first flat loading surface, the peripheral protruding portion securing within the cargo container, the first flat loading surface defining grooves for the deposition of water and mud.

13. The adjustable cargo bin of claim 12, wherein the first flat loading surface defines a recession for a handle.

14. The adjustable cargo bin of claim 13, wherein the cover for the cargo container pivots at two corners of the cargo container.

15. The adjustable cargo bin of claim 14, further comprising:
first and second brackets on the cargo container, the brackets each defining a hole; and
first and second locking tabs protruding from corners of the covering, the tabs locking the cover into a closed position.

16. The adjustable cargo bin of claim 11, wherein the cover for the cargo container is blow-molded.

17. The adjustable cargo bin of claim 11, wherein the cover for the cargo container is hollow plastic.

18. The adjustable cargo bin of claim 11, wherein the cargo container is located over a spare tire.

19. In a rear cargo bin disposed behind of a rear passenger seat of a vehicle, the rear passenger seat including a pivoting seat back defining a rear surface that is inclined relative to horizontal when the seat back is pivoted forward into a stowed position, the improvement comprising:
a reversible lid having a first face defining a first flat loading surface and a second face opposite the first face defining a second flat loading surface, such that the first flat loading surface is generally horizontal when the lid is positioned atop the cargo bin with the first face of the lid facing upward, and the second flat loading surface is generally coplanar with the rear surface of the stowed seat back when the lid is positioned atop the cargo bin with the second face of the lid facing upward.

20. The cargo bin of claim 19, wherein the lid is removably pivotally attached to the vehicle proximate to a forward edge of the lid.

* * * * *